United States Patent
Thompson

(10) Patent No.: US 8,530,036 B2
(45) Date of Patent: Sep. 10, 2013

(54) HARD SHELL BODYBOARD KICKBOARD

(76) Inventor: Dean Ronald Thompson, Kowloon (CN)

(*) Notice: Subject to any disclaimer, the term of this patent is extended or adjusted under 35 U.S.C. 154(b) by 400 days.

(21) Appl. No.: 12/842,404

(22) Filed: Jul. 23, 2010

(65) Prior Publication Data

US 2012/0021181 A1 Jan. 26, 2012

(51) Int. Cl.
- *B32B 3/12* (2006.01)
- *A63C 5/00* (2006.01)
- *A63C 17/01* (2006.01)
- *E04F 13/00* (2006.01)
- *G09B 19/22* (2006.01)
- *A63H 33/00* (2006.01)
- *B63B 35/00* (2006.01)
- *B63B 3/00* (2006.01)

(52) U.S. Cl.
USPC ............... 428/159; 280/600; 280/601; 52/11; 52/311.1; 434/128; 446/26; 482/142; 441/65; 441/74; 441/79; 114/355

(58) Field of Classification Search
None
See application file for complete search history.

(56) References Cited

U.S. PATENT DOCUMENTS

| 5,634,834 | A  * | 6/1997  | Cole et al. ............. 441/65 |
| 5,967,314 | A  * | 10/1999 | McGovern .......... 206/315.1 |
| 7,029,349 | B2 * | 4/2006  | Lin .................... 441/65 |
| 7,338,066 | B2 * | 3/2008  | Riepler ................ 280/610 |
| 2002/0090869 | A1 * | 7/2002 | Hasted ................. 441/65 |
| 2006/0276087 | A1 * | 12/2006 | Conner ................ 441/74 |
| 2008/0032575 | A1 * | 2/2008 | Wyrsta et al. .......... 441/74 |
| 2012/0106149 | A1 * | 5/2012 | Boa .................... 362/235 |

FOREIGN PATENT DOCUMENTS

GB 2225276 A * 10/1989

* cited by examiner

*Primary Examiner* — David Sample
*Assistant Examiner* — Nicole T Gugliotta
(74) *Attorney, Agent, or Firm* — Clement Cheng

(57) ABSTRACT

A sports board has a hard top shell formed with a top concave shell cavity. The hard top shell has an inside surface. The hard top shell is pervious to light. A top layer of adhesive adheres to the hard top shell. A rigid foam core is formed with a top profile and a bottom profile. The top profile matches and receives the top hard shell. The top layer of adhesive adheres to a top surface of the foam core. A bottom layer of adhesive adheres to a bottom surface of the rigid foam core; and a hard bottom shell is formed with a bottom concave shell cavity. The bottom concave shell cavity is formed to fit to the bottom profile. The hard bottom shell is pervious to light.

4 Claims, 3 Drawing Sheets

HARD SHELL BODYBOARD KICKBOARD

FIELD OF THE INVENTION

The present invention is in the field of sports boards.

DISCUSSION OF RELATED ART

A variety of patents describe different configurations for applying printed film to a soft body board. A variety of sports boards have been treated with different constructions for maintaining a balance between cost and performance. Sports boards can be stiff, or have variable stiffness such as described in Moran U.S. Pat. No. 5,224,890 issued Jul. 6, 1993, entitled Bodyboard With Variable Stiffness the disclosure of which is incorporated herein by reference. Szabad in U.S. Pat. No. 4,850,913 describes a sports board having a slick film surface and a method for making, issued Jul. 25, 1989. Szabad teaches a sports board for surfing, snow sledding or other sports having a shaped polyethylene foam core to which a polyethylene film and polyethylene foam sheet laminate is heat laminated over substantially all the surfaces of the core Core stiffening has also been accomplished by using expanded polystyrene for the sports board core. Burke in U.S. Pat. No. 6,908,351 issued Jun. 21, 2005 entitled Expanded polystyrene core sports board, provides for an expanded polystyrene core sports board, the disclosure of which is incorporated herein by reference. The expanded polystyrene's core sports board has side rail skins and a slick skin on the bottom with a blend of expanded polystyrene and polyethylene on the top.

Schneider in U.S. Pat. No. 5,211,593 provides a foam core structure with graphics imprinted skin, issued May 18, 1993, the disclosure of which is incorporated herein by reference. Schneider discloses a multi-layer graphics imprinted skin laminated to a sports board.

Pearson in U.S. Pat. No. 6,203,389 entitled bodyboard, issued Mar. 20, 2001 describes a bodyboard, "having a durable, slick outer skin on the lower surface, a conventional upper surface and a specially shaped lower surface for maximized speed, maneuverability, and performance", learned disclosure of which is incorporated herein by reference. Pearson teaches a polystyrene core covered by bidirectional epoxy cloth, which has been popular in less expensive sports boards. Unfortunately, the epoxy cloth is usually not very durable.

Yeh in U.S. Pat. No. 6,988,920 entitled Slider having improved resistance to erosion and wear, issued Jan. 24, 2006, describes a bodyboard that has a polyethylene foam skin laminated to a polyethylene foam board, the disclosure of which is incorporated herein by reference. Yeh teaches a soft outer film receiving graphic print and being bonded to the polyethylene foam board with a plurality of concave depression formed on the top and side edges to enhance grip. A variety of different configurations have been tested in the water, in the marketplace, and described in the patent literature. While there has been much advancement in the area of high end performance body boards, there has been little improvement in improving less-expensive constructions.

SUMMARY OF THE INVENTION

A sports board is generally planar and has a large bottom surface and top surface relative to a pair of side surfaces on the left and right edges. The sports board preferably has a nose and tail. The sports board is generally of a flat shape for riding on water. The present invention differs from the prior art in that the top as well as the bottom is both a hard shell construction, while at the same time also having high definition graphic presentation.

The sports board has a hard top shell formed with a top concave shell cavity. The hard top shell has an inside surface. The hard top shell is pervious to light. A top layer of adhesive adheres to the hard top shell. A rigid foam core is formed with a top profile and a bottom profile. The top profile matches and receives the top hard shell. The top layer of adhesive adheres to a top surface of the foam core. A bottom layer of adhesive adheres to a bottom surface of the rigid foam core; and a hard bottom shell is formed with a bottom concave shell cavity. The bottom concave shell cavity is formed to fit to the bottom profile. The hard bottom shell is pervious to light.

In general, is desired that the hard top shell has a first printing means, and the hard bottom shell further has a second printing means. The hard top shell, rigid foam core, and hard bottom shell are preferably formed with a bottom convex. The hard top shell may include a top printing means, and the hard bottom shell may include a bottom printing means. The top printing means further comprises a graphic film a foil layer laminated to a graphic print layer, and the graphic print layer may be laminated to the hard top shell. The hard top shell may include a top printing means, and the hard bottom shell may have a bottom printing means wherein the top printing means further comprises painting a lower surface of the hard top shell. The hard top shell may have a top printing means, and the hard bottom shell may have a bottom printing means. The bottom printing can be a multi-layer graphic film having a foil layer laminated to a graphic print layer so that the graphic print layer is laminated to a top surface of the hard bottom shell.

The hard top shell may also have a top printing means, and the hard bottom shell having a bottom printing means so that the bottom printing means further includes painting an upper surface of the hard top shell. The sports board preferably includes a pair of top grip grooves disposed on a top surface of the sports board and a pair of bottom grip grooves disposed on the bottom surface of the sports board configured such that the hard top shell, rigid foam core, and hard bottom shell are formed with the pair of top grip grooves and the pair of bottom grip grooves.

Figure 1:
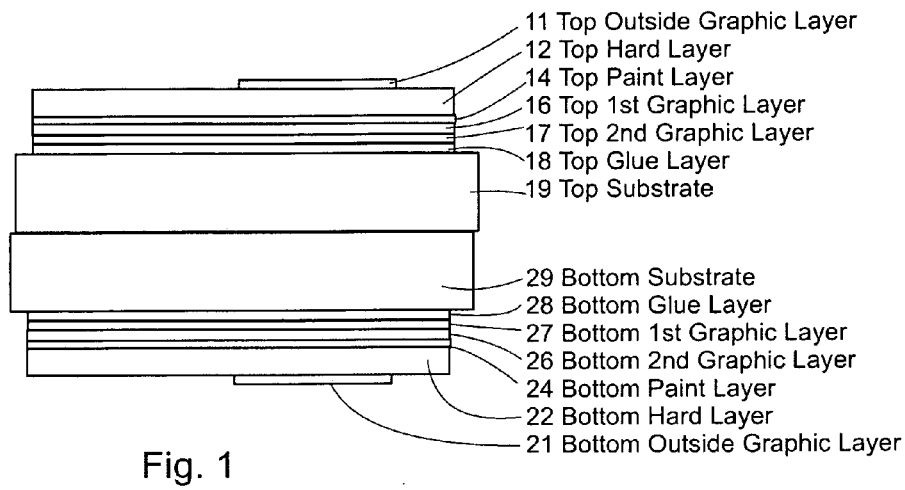
FIG. 1 is a close-up cross-section diagram of the layer construction.
Figure 2:
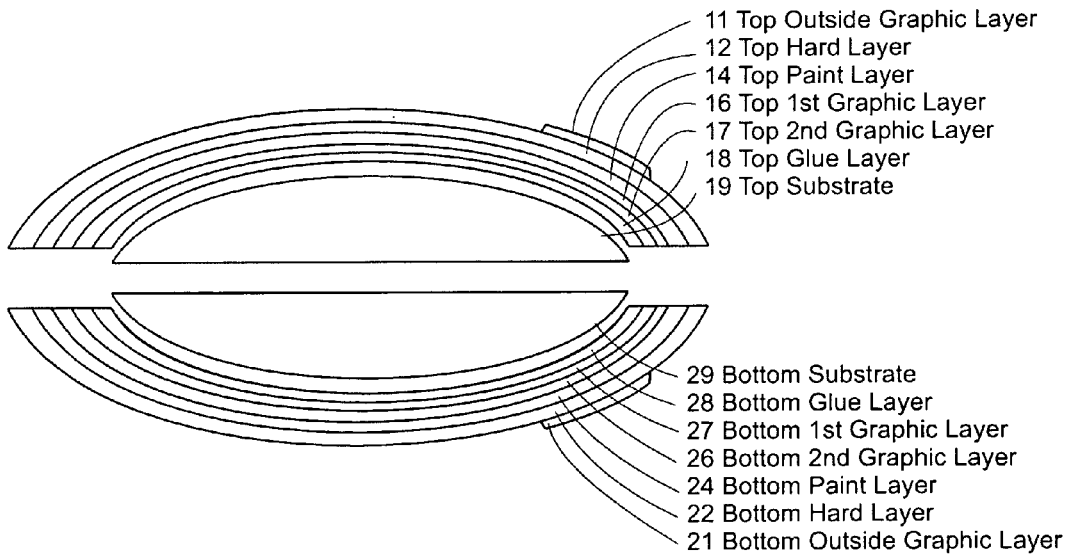
FIG. 2 is an exploded view diagram of the layer construction.
Figure 3:
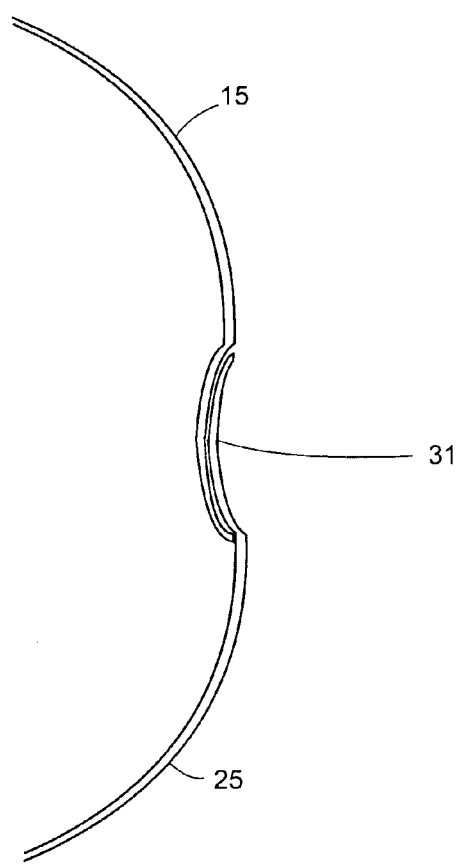
FIG. 3 is a cross-section diagram of the overlap channel construction where the bottom shell covers an edge of the top shell.
Figure 4:
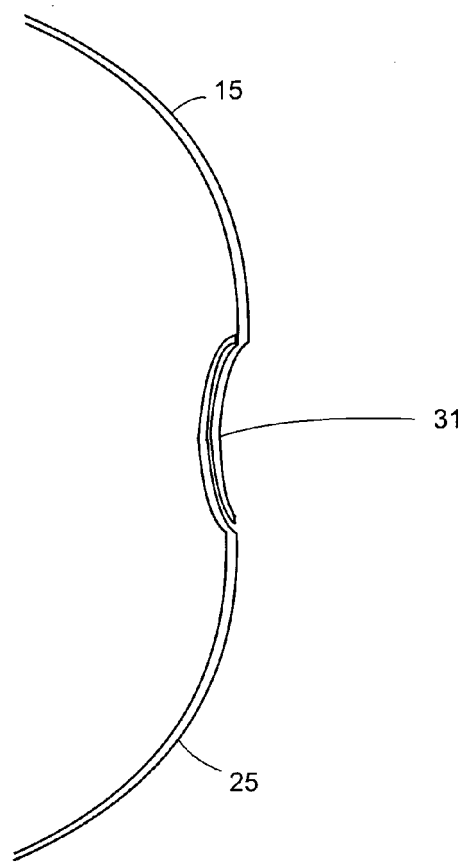
FIG. 4 is a cross-section diagram of the overlap channel construction where the top shell covers an edge of the bottom shell.
Figure 5:
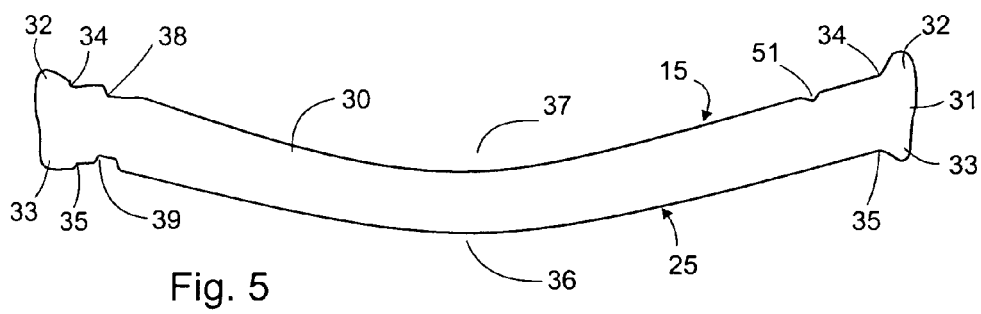
FIG. 5 is a cross-section diagram of the sports board showing a multiple step configuration on the left side and a single step configuration on the right side.
Figure 6:
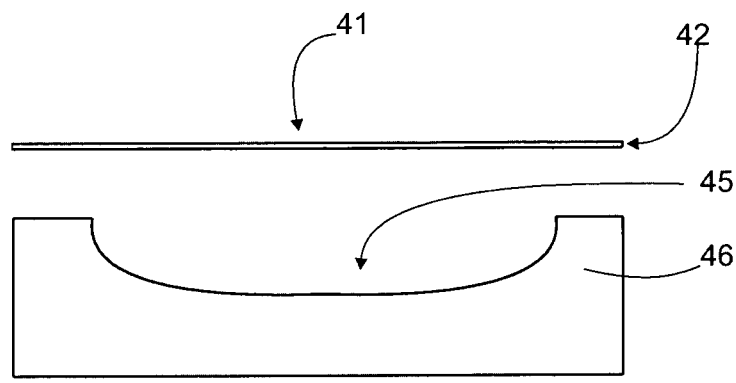
FIG. 6 is a cross-section diagram of the hard sheet introduced into the mold.
Figure 7:
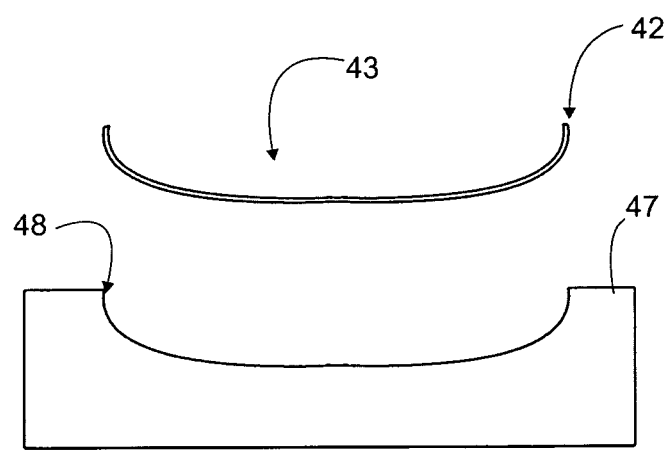
FIG. 7 is a cross-section diagram of the hard shell been removed from the mold.

The following call out list of elements can be useful in referencing the element numbers of the drawings.
11 Top Outside Graphic Layer
12 Top Hard Layer
14 Top Paint Layer 15 Top Shell
16 Top 1st Graphic Layer
17 Top 2nd Graphic Layer
18 Top Glue Layer
19 Top Substrate
21 Bottom Outside Graphic Layer
22 Bottom Hard Layer
24 Bottom Paint Layer
25 Bottom Shell
26 Bottom 2nd Graphic Layer
27 Bottom 1st Graphic Layer
28 Bottom Glue Layer
29 Bottom Substrate
30 Foam Core
31 Overlap Channel
32 Top Grip
33 Bottom Grip
34 Top Groove
35 Bottom Groove
36 Bottom Convex
37 Top Concave
38 Second Top Grip Groove
39 Second Bottom Grip Groove
41 Sheet Of PVC
42 Sheet Edge
43 Shell Cavity
45 Mold Cavity
46 Mold
47 Mold Top Face
48 Mold Top Edge
51 Inside Lengthwise Groove

DETAILED DESCRIPTION OF THE PREFERRED EMBODIMENT

The present invention body board is made in three basic parts, the top shell 15 is formed as a top cover that is preferably a hard shell of PVC which can be flexible. The bottom shell 25 is formed as a bottom cover which is also preferably a hard shell of PVC which can be flexible. The middle portion is a relatively rigid polyolefin foam such as polystyrene. The top cover is molded to a relatively hard shell shape, then the bottom cover is molded to a relatively hard shell shape, and the top cover is fitted over a polystyrene core. It is preferred to make a batch of top covers, then make a batch of bottom covers and then making a batch of polystyrene cores that match the top and bottom covers. The final step involves assembly using a spray or film glue to glue the top and bottom covers to the polystyrene core. The preferred glue is a spray on glue.

The top layer or top shell has a top hard layer 12 providing structural rigidity and structural strength to the top shell 15. The top hard layer 12 is preferably a sheet of transparent or translucent PVC that can be formed into a shell structure by vacuum forming in a hollow formation cavity. Depending upon the final shape, the top hard layer 12 can be made hard and rigid with as thin as 1 mil thickness PVC, but can also be about 100 mil thick PVC if necessary, such as if the plank shape is relatively flat.

A hollow formation cavity of a mold cavity 45 can receive a rectangular sheet of PVC 41 having a sheet edge 42 around the edge of the sheet. The mold cavity 45 is an opening which receives a heated piece of transparent PVC and vacuum forms the sheet into a shell such as a top shell 15 having a shell cavity 43. The shell cavity is concave. The top mold face 47 surrounds the mold cavity 45. An edge of the mold, namely the mold top edge 48 defines the extent of the suction power. Suction is formed in the mold cavity 45 by a plurality of openings on the surface of the mold cavity 45.

The sheet of PVC 41 is preferably first laminated to other sheets, and then trimmed with a trimming machine so that sheet edges 42 are formed. The sheet of PVC 41 is then heated until it is soft enough to be vacuum formed in a mold cavity 45 of a mold 46 so that the hard sheet is bent to form a shell cavity 43. The mold top face 47 is preferably flat so as to form a vacuum along eight mold top edge 48 four sucking in the hard sheet 41.

Before placing into the mold machine, the top hard layer 12 receives a top paint layer 14 on an underside of the top hard layer 12. Also before placing into the mold machine, the top hard layer 12 optionally receives a top first graphic layer 16 or a top second graphic layer. Printing means may include a means for adding graphics to the top shell which is the hard-top layer. For example, the top first graphic layer can be a foil such as a metallized plastic sheet that is laminated to the top paint layer 14, and the top second graphic layer can be a sheet of plastic film.

Alternatively, the top first graphic layer can be a graphic film and at least some portions of the top paint layer 14 can be omitted so that the graphic film can be seen through the clear top hard layer 12. Alternatively, the top shell can be directly screenprinted with a foil as the first or second graphic layer under the screen printing. Foil means metallic colored film which may have thin metal deposit, not a thick sheet of metal like standard kitchen use aluminum foil.

An overlap channel 31 is preferably formed on a side of the board. The overlap channel 31 includes a depression beginning from a surface of the top shell 15 and a surface of the bottom shell 25. The top shell can cover an edge of the bottom shell, or the bottom shell can cover an edge of the top shell. The overlap channel 31 can be made by preforming the three basic parts to have an overlap channel 31 as a part of the construction. The overlap channel 31 can also be made by a heated roller applied around the peripheral edge of the bodyboard for thermal lamination of the overlap channel 31.

After assembly, the top outside surface may receive a top outside graphic layer 11 which can be applied to the outside surface of the top hard layer 12. The top outside graphic layer 11 can be formed as an adhesive sticker, or as a thermally laminated plastic sheet that adheres to the top hard layer 12. The overlap channel 31 includes the elements of the laminate construction including the top paint layer 14 which is bonded to a top first graphic layer 16, a top second graphic layer 17 and glued by a top glue layer 18 to a top substrate 19. The glue layer 18 can be applied by a plastic adhesive film or by spray glue. It is preferred to use a spray glue 18. Along the overlap portion, the spray glue 18 either: adheres the outside surface of the top hard layer 12 to the inside surface of the modern glue layer 28; or adheres the outside surface of the bottom hard layer 22 to the inside surface of the top glue layer 18.

The construction of the bottom layer is substantially similar to the construction of the top layer. The bottom layer has a bottom outside graphic layer 21 overlying a bottom hard layer 22, which in turn receives a bottom paint layer 24, and a bottom second graphic layer 26 and a bottom first graphic layer 27 which is secured by a bottom glue layer 28 to a bottom substrate 29. A top substrate 19 can be connected to the bottom substrate 29 especially if the substrate is made of similar material so that the core can be a multiple layer core.

In addition to an overlap channel 31, the sports board has additional features including a top grip 32 which protrudes from a top surface at the edge of the top shell. The sports board also has a bottom grip 33 which protrudes from a bottom surface at the edge of the bottom shell. The top grip protrudes to form a top groove 34 which is an indented portion defining a generally flat top surface and a border of the top grip 32. Similarly, a bottom grip 33 protrudes from a bottom surface of an edge of the bottom shell. The bottom grip 33 also may define a bottom groove 35 again at an interface of the bottom grip 33 and the bottom surface of the bottom shell 25.

The top grip 32 is preferably formed as an elongated bulbous protrusion from a top surface of the sports board. The top grip may have a generally round profile, or an angled profile for fitting in to the palm of a hand. The top grip can alternatively be formed as a stepped configuration with secondary steps for allowing different handgrip positions and also for allowing different sized hands. When there is a stepped configuration, the steps extend along the side of the board. The stepped configuration forms a second top grip groove 38 and a second bottom grip groove 39. When a second top grip groove 38 is formed along with a first top grip groove and a first top grip 32, the resulting configuration can be a stepped configuration such that the gentle downward slope of the board from the outside to the inside can be made to be formed as a series of steps when seen from a side view. There can be one, two, three or four steps as needed. The steps can be formed similarly on the bottom to form a handgrip.

The sports board has a bottom convex 36 such that the bottom bends downward in the middle, similar to a boat hull bottom. The bottom convex preferably passes longitudinally along the bottom surface of the bottom shell 25. Analogously, a top concave 37 is formed in the top shell 15. The top concave 37 also preferably passes along the top surface of the top shell 15. The board is also preferably curved in the lengthwise direction as well as being curved in the width wise direction. Being curved in both directions forms a bowl like structure. The rigid foam core, preferably made an extended polystyrene is preferably formed with a bottom convex.

An inside lengthwise groove 51 can be disposed along the length of the board slightly further away from the left and right edge of the board. It is preferred that the sports board is symmetrical. Exterior shapes on the top shell and a bottom shell can be of distinct profiles and the substrate core portion can also be made according to the same profile.

The best mode for manufacturing the board is according to the following steps. The first step is to print the inside surface of the hard shell. The second step is to use laser printing for printing film which is heat laminated to the inside surface of the hard shell. The third step is to form the hard shell. The fourth step is to trim the hard shell edge in a trimmer. The fifth step is to spray glue on the inside of the hard shell. The next step is to assemble the expanded polystyrene foam core with the hard shell top portion and hard shell bottom portion. The seventh step is to use heat and pressure for bonding all of the pieces together in a hot presser machine. The hot presser machine has a pair of heated top and bottom pads shaped to conform to the shape of the board. Step eight is to trim the edge and seal the edge along the overlap channel 31. The top outside graphic layer 11 such as labels and other graphic decals can be applied in the final step, and afterwards packaging steps such as the hang and final inspection can be completed.

The best mode also includes the step of either painting the inside surface of the hard shell, or laminating printed film to the inside surface of the hard shell. Depending upon the design, it is generally more feasible to only paint the inside surface of the hard shell or only laminating printed film to the inside surface of the hard shell. The printed film can be printed on the inside surface of the printed film in reverse, or on the outside surface of the printed film in a positively printed non-inverted manner. The best mode is to print the film in a positively printed manner such that the print is on the top surface or outside of the printed film. The printing on the outside surface of the printed film would mean that the PVC and the printed portion may be touching.

The printing on the printed film can be opaque or a shiny lucent paint. The best mode for printing means is to print on the outside surface of a foil sheet which is then laminated to the PVC. It is also possible to use a bilayer printed film construction by having print on the inside surface of a clear sheet which then receives a foil sheet underneath the clear sheet. The bi-layer printed film construction can be first printed in a roll and laminated together in a roll of printed film, for later lamination to a PVC sheet. Another manner of printing would be to print on the inside surface of the PVC sheet, and laminate a foil underneath the PVC sheet.

Therefore, while the presently preferred forms of the invention been shown and described, and several modifications thereof discussed, persons skilled in this art will readily appreciate that various additional changes and modifications may be made without departing from the spirit of the invention, as defined and differentiated by the following claims.

The invention claimed is:

1. A sports board, of generally planar configuration comprising:
   a. a hard top shell formed with a top concave shell cavity, wherein the top concave shell cavity is concave from an inside direction, wherein the hard top shell has an inside surface, wherein the hard top shell is pervious to light;
   b. a top layer of adhesive adhering to the hard top shell;
   c. a rigid foam core formed as a plank and formed with a top profile and a bottom profile, wherein the top profile matches and receives the top hard shell, wherein the top layer of adhesive adheres to a top surface of the foam core;
   d. a bottom layer of adhesive adhering to a bottom surface of the rigid foam core; and;
   e. a hard bottom shell formed with a bottom concave shell cavity, wherein the bottom concave shell cavity is formed to fit to the bottom profile, wherein the hard bottom shell is pervious to light, wherein the hard top shell further comprises a top printing means, and wherein the hard bottom shell further comprises a bottom printing means wherein the top printing means further comprises painting a lower surface of the hard top shell, and further comprising an overlap channel applied around a peripheral edge of the sports board joining the hard top shell with the hard bottom shell.

2. A sports board, of generally planar configuration comprising:
   a. a hard top shell formed with a top concave shell cavity, wherein the top concave shell cavity is concave from an inside direction, wherein the hard top shell has an inside surface, wherein the hard top shell is pervious to light;
   b. a top layer of adhesive adhering to the hard top shell;
   c. a rigid foam core formed as a plank and formed with a top profile and a bottom profile, wherein the top profile matches and receives the top hard shell, wherein the top layer of adhesive adheres to a top surface of the foam core;
   d. a bottom layer of adhesive adhering to a bottom surface of the rigid foam core; and
   e. a hard bottom shell formed with a bottom concave shell cavity, wherein the bottom concave shell cavity is formed to fit to the bottom profile, wherein the hard bottom shell is pervious to light, wherein the hard top shell further comprises a first printing means, wherein the hard bottom shell further comprises a second printing means, wherein the hard top shell is made of PVC, wherein the hard bottom shell is made of PVC, wherein the rigid foam core is made of expanded polystyrene, wherein the hard top shell further comprises a top printing means, and wherein the hard bottom shell further comprises a bottom printing means wherein the top printing means further comprises painting a lower surface of the hard top shell, and further comprising an overlap channel applied around a peripheral edge of the sports board joining the hard top shell with the hard bottom shell.

3. The sports board of claim 2 wherein, a. the first printing means and the second printing means are graphics on a foil layer.

4. The sporting board of claim 3, further comprising a pair of top grip grooves disposed on a top surface of the sports board and a pair of bottom grip grooves disposed on the bottom surface of the sports board, wherein the hard top shell, rigid foam core, and hard bottom shell are formed with the pair of top grip grooves and the pair of bottom grip grooves.

* * * * *